US009090981B2

(12) United States Patent
Brichese et al.

(10) Patent No.: US 9,090,981 B2
(45) Date of Patent: Jul. 28, 2015

(54) ELECTRODE FOR ELECTROLYTIC PROCESSES AND METHOD OF MANUFACTURING THEREOF

(75) Inventors: Marianna Brichese, Caorle (IT); Antonio Lorenzo Antozzi, Merate (IT); Alice Calderara, Agnadello (IT)

(73) Assignee: INDUSTRIE DE NORA S.P.A., Milan (IT)

( * ) Notice: Subject to any disclaimer, the term of this patent is extended or adjusted under 35 U.S.C. 154(b) by 0 days.

(21) Appl. No.: 14/006,496

(22) PCT Filed: May 3, 2012

(86) PCT No.: PCT/EP2012/058144
§ 371 (c)(1),
(2), (4) Date: Sep. 20, 2013

(87) PCT Pub. No.: WO2012/150307
PCT Pub. Date: Nov. 8, 2012

(65) Prior Publication Data
US 2014/0008215 A1    Jan. 9, 2014

(30) Foreign Application Priority Data

May 3, 2011 (IT) .............................. MI2011A0735

(51) Int. Cl.
| | |
|---|---|
| C25B 11/08 | (2006.01) |
| C25B 11/04 | (2006.01) |
| B01J 23/46 | (2006.01) |
| B01J 23/89 | (2006.01) |
| B01J 37/02 | (2006.01) |
| C23C 18/12 | (2006.01) |
| H01M 4/90 | (2006.01) |

(52) U.S. Cl.
CPC .............. *C25B 11/04* (2013.01); *B01J 23/462* (2013.01); *B01J 23/892* (2013.01); *B01J 37/0225* (2013.01); *C23C 18/12* (2013.01); *C23C 18/1216* (2013.01); *C23C 18/1225* (2013.01); *C25B 11/0484* (2013.01); *H01M 4/9016* (2013.01)

(58) Field of Classification Search
CPC  C25B 11/00; C25B 11/0473; C25B 11/0478; C25B 11/0494

USPC ................... 204/290.14, 290.01, 292
See application file for complete search history.

(56) References Cited

U.S. PATENT DOCUMENTS

| | | | | |
|---|---|---|---|---|
| 4,157,943 | A  * | 6/1979 | Scarpellino et al. | 205/176 |
| 4,545,886 | A  * | 10/1985 | de Nora et al. | 204/252 |
| 5,358,889 | A | 10/1994 | Emesh et al. | |
| 7,378,005 | B2 * | 5/2008 | Kaneda et al. | 204/290.13 |
| 8,034,221 | B2 * | 10/2011 | Arimoto | 204/290.1 |
| 2006/0231387 | A1 | 10/2006 | Houda et al. | |
| 2008/0200703 | A1 | 8/2008 | Van Laar et al. | |

FOREIGN PATENT DOCUMENTS

| | | | |
|---|---|---|---|
| EP | 0135475 | 3/1985 | |
| EP | 545869 B1 * | 5/1996 | 204/280 |
| EP | 1916320 | 4/2008 | |
| WO | 2008/043766 | 4/2008 | |
| WO | WO 2008043766 A2 * | 4/2008 | 204/280 |
| WO | 2011/101477 | 8/2011 | |

OTHER PUBLICATIONS

Long, Jeffrey W. et al., "Voltammetric Characterization of Ruthenium Oxide-Based Aerogels and Other RuO2 Solids: The Nature of Capacitance in Nanostructured Materials", Langmuir, 1999, 15, pp. 780-785.*
McKeown, David A. et al. "Structure of Hydrous Ruthenium Oxides: Implications for Charge Storage", Journal of Phyiscal Chemistry B, 1999, 103, pp. 4825-4832.*
International Search Report issued in counterpart PCT Application No. PCT/EP2012/058144.
International Preliminary Report on Patentability in counterpart PCT Application No. PCT/EP2012/058144.

* cited by examiner

*Primary Examiner* — Luan Van
*Assistant Examiner* — Alexander W Keeling
(74) *Attorney, Agent, or Firm* — Lucas & Mercanti, LLP

(57) ABSTRACT

The invention relates to an electrode for electrolytic processes, particularly to a cathode suitable for hydrogen evolution in an industrial electrolysis process comprising a metal substrate coated with an external catalytic layer containing crystalline ruthenium oxide having a highly ordered rutile-type structure with Ru Ru and Ru O bond length characterized by a Debye-Waller factor lower than a critical value. The catalytic outer layer may contain rare earth oxides, such as praseodymium. The electrode may also comprise an internal catalytic thin layer platinum-based, which gives an enhanced protection against accidental current reversal events.

4 Claims, No Drawings

ELECTRODE FOR ELECTROLYTIC PROCESSES AND METHOD OF MANUFACTURING THEREOF

This application is a U.S. national stage of PCT/EP2012/058144 filed on May 3, 2012 which claims the benefit of priority from Italian Patent Application No. MI2011A000735 filed May 3, 2011, the contents of each of which are incorporated herein by reference.

FIELD OF THE INVENTION

The invention relates to an electrode for electrolytic processes, in particular to a cathode suitable for evolving hydrogen in an industrial electrolytic process, and to a method for manufacturing the same.

BACKGROUND OF THE INVENTION

The invention relates to an electrode for electrolytic processes, in particular to a cathode suitable for evolving hydrogen in an industrial electrolytic process. The electrolysis of alkali brines for the simultaneous production of chlorine and alkali and the processes of electrochemical production of hypochlorites and chlorates are the most typical examples of industrial electrolytic applications with cathodic hydrogen evolution, but the electrode is not limited to any particular application. In the industry of electrolytic processes, competitiveness is associated to several factors, the main of which is the reduction of energy consumption, directly associated with the process voltage; this justifies the many efforts directed to decrease the various components of the latter, among which cathodic overvoltage has to be counted. Cathodic overvoltages that can be naturally obtained with electrodes of chemically resistant materials (for instance carbon steel) having no catalytic activity were long considered acceptable. The market nevertheless requires, in the specific case, higher and higher caustic product concentrations, which made the use of carbon steel cathodes unfeasible due to corrosion problems; moreover, the increase in the cost of energy made the use of catalysts advisable in order to facilitate the cathodic evolution of hydrogen. One possible solution is using nickel substrates, more chemically resistant than carbon steel, and platinum-based catalytic coatings. Cathodes of such type are normally characterised by acceptable cathodic overvoltages, presenting however very high costs due to the use of platinum and limited operative lifetimes, likely due to the poor adhesion of the coating to the substrate. A partial improvement in the adhesion of the catalytic coating on nickel substrates can be obtained by adding cerium to the catalytic coating formulation, optionally as porous external layer with a protective function towards the underlying platinum-based catalytic layer; this type of cathode however tends to suffer serious damages following the occasional current reversals inevitably produced in industrial plants in case of failures.

A partial improvement in the tolerance to current reversal is obtainable by activating the nickel cathode substrate by means of a coating consisting of two distinct phases, a first phase comprising the noble metal-based catalyst and a second phase having a protective function comprising palladium, optionally in admixture with silver. This type of electrode nevertheless presents a sufficient catalytic activity only in case the noble metal phase contains high amounts of platinum, preferably with a significant addition of rhodium; for example, replacing platinum with cheaper ruthenium in the catalytic phase entails the onset of remarkably higher cathodic overvoltages. Moreover, the manufacturing of the coating consisting of two distinct phases requires an extremely delicate process control in order to achieve sufficiently reproducible results.

Thus, it becomes evident the need for a new cathode composition for industrial electrolytic processes, in particular for electrolytic processes with cathodic evolution of hydrogen, characterised, in comparison with the prior art, by an equal or higher catalytic activity, a lower overall raw material cost, a higher reproducibility in the preparation and an equal or higher lifetime and tolerance to accidental current reversals at the usual operative conditions.

SUMMARY OF THE INVENTION

Various aspects of the invention are set out in the accompanying claims.

Under one aspect, an electrode for electrolytic processes comprises a metal substrate, for instance made of nickel, copper or carbon steel, coated with an external catalytic layer comprising 4-40 g/m$^2$ of crystalline ruthenium oxide having a highly ordered rutile-type structure, i.e. with Ru—Ru and Ru—O bond length characterised by a Debye-Waller factor lower than $2*10^{-3}$ Å$^2$. The inventors observed that such a high degree of order in rutile-type RuO$_2$ crystals is capable of imparting surprising catalytic activity and current reversal tolerance characteristics.

In one embodiment, the external catalytic layer further contains 1 to 10 g/m$^2$ of rare earths, optionally praseodymium, in form of oxides. This can have the advantage of further enhancing current reversal tolerance for a given ruthenium loading.

In one embodiment, the electrode further comprises an internal catalytic layer interposed between the substrate and the external catalytic layer; the internal catalytic layer has a modest amount of platinum, for instance comprised between 0.5 and 2 g/m$^2$, in form of metal or oxide. This can have the advantage of sensibly improving the electrode tolerance to current reversal, surprisingly bringing it to values very close to those characteristic of electrodes activated with high amounts of pure platinum, which is more robust but much more expensive than ruthenium.

In one embodiment, the metal substrate consists of a nickel mesh or punched sheet.

Under another aspect, a method for manufacturing an electrode as hereinbefore described comprises applying a chloride-free acetic solution of ruthenium to a metal substrate, obtained starting from a ruthenium nitrate, for instance Ru(III) nitrosyl nitrate, a commercially available compound expressed by the formula Ru(NO)(NO$_3$)$_3$ or sometimes as Ru(NO)(NO$_3$)$_x$ indicating that the average valence state of ruthenium can slightly deviate from 3. This species, which in one embodiment is present in the solution at a concentration of 60-200 g/l, has the advantage of being easily available in a quantity sufficient for an industrial production of electrodes. In one embodiment, the method comprises preparing a ruthenium solution by dissolution of a ruthenium nitrate in glacial acetic acid under stirring, with the optional addition of nitric acid, followed by a dilution with an aqueous solution of acetic acid at a concentration comprised between 5 and 20% by weight; the subsequent application of the obtained solution on a metal substrate in multiple coats, with thermal decomposition at 400-600° C. for a time not lower than 2 minutes after each coat. The solution can be applied for instance to a nickel mesh or to an expanded or punched sheet by electrostatic spraying, brushing, dipping or other known techniques. After the deposition of each coat of solution, the substrate may be subjected to a drying phase, for instance for 5-15 minutes at 80-100° C., followed by thermal decomposition at 400-600° C. for a time not lower than two minutes and usually comprised between 5 and 20 minutes. The above indicated concentrations allow the deposition of about 10-15 g/m$^2$ of ruthenium in 4-10 coats.

In one embodiment, prior to the application to the substrate, the ruthenium solution is mixed to the solution of a rare earth, for instance praseodymium, obtained by dissolution of rare earth nitrates in glacial acetic acid under stirring, with optional addition of nitric acid. Optionally, the concentration of the thus obtained ruthenium solution can be suitably diluted, before the application, with a 5-20% wt. acetic acid solution.

In one embodiment, prior to the application and subsequent decomposition of the ruthenium solution, containing or not rare earths, the method comprises applying in multiple coats and then thermally decomposing at 400-600° C. for a time not lower than 2 minutes after each coat a platinum solution obtained by dissolution of a platinum nitrate or nitrite (for instance Pt diamino dinitrate $Pt(NH_3)_2(NO_3)_2$), in glacial acetic acid under stirring, with optional addition of nitric acid, followed by dilution with an aqueous solution of acetic acid at a concentration of 5 to 20% by weight.

The inventors surprisingly observed that the degree of crystalline order and hence the activity, lifetime and tolerance to current reversal of ruthenium-catalysed electrodes used as cathodes for hydrogen evolution turn out to be much higher if substantially chloride-free nitrate-based precursors in acetic solution are used for their preparation, rather than the common precursor of the prior art consisting of $RuCl_3$ in hydrochloric solution. Without wishing the invention to be limited by any particular theory, this might be due to the initial formation of a complex species in which a ruthenium atom is coordinated with acetic or carboxylic ligands, in the absence of coordination bonds with chloride. Chlorides possibly present in a precursor solution for the preparation of electrodes must be eliminated during the thermal decomposition step; it is possible that the removal of such a bulky ion from the crystal lattice under formation would produce warping of the same, decreasing its degree of order.

Some of the most significant results obtained by the inventors are presented in the following examples, which are not intended to limit the domain of the invention.

EXAMPLE 1

A quantity of $Ru(NO)(NO_3)_3$ corresponding to 100 g of Ru was dissolved in 300 ml of glacial acetic acid with the addition of a few ml of concentrated nitric acid. The solution was stirred for three hours keeping the temperature at 50° C. The solution was then brought to a volume of 500 ml with 10% wt. acetic acid (ruthenium solution).

Separately, a quantity of $Pr(NO_3)_2$ corresponding to 100 g of Pr was dissolved in 300 ml of glacial acetic acid with addition of few ml of concentrated nitric acid. The solution was stirred for three hours keeping the temperature at 50° C. The solution was then brought to a volume of 500 ml with 10% wt. acetic acid (rare earth solution). 480 ml of the ruthenium solution were mixed to 120 ml of the rare earth solution and left under stirring for five minutes. The thus obtained solution was brought to 1 litre with 10% wt. acetic acid (precursor).

A mesh of nickel 200 of 100 mm×100 mm×0.89 mm size was subjected to a process of blasting with corundum, etching in 20% HCl at 85° C. for 2 minutes and thermal annealing at 500° C. for 1 hour. The precursor was then applied by brushing in 6 subsequent coats, carrying out a drying treatment for 10 minutes at 80-90° C. and a thermal decomposition for 10 minutes at 500° C. after each coat until obtaining a deposition of 11.8 g/m$^2$ of Ru and 2.95 g/m$^2$ of Pr.

The sample was subjected to a performance test, showing an ohmic drop-corrected initial cathodic potential of −924 mV/NHE at 3 kA/m$^2$ under hydrogen evolution in 33% NaOH, at a temperature of 90° C., which indicates an excellent catalytic activity.

The same sample was subsequently subjected to cyclic voltammetry in a range of −1 to +0.5 V/NHE at a 10 mV/s scan rate; after 25 cycles, the cathodic potential was −961 mV/NHE, which indicates an excellent current reversal tolerance.

EXAMPLE 2

A quantity of $Ru(NO)(NO_3)_3$ corresponding to 100 g of Ru was dissolved in 300 ml of glacial acetic acid with addition of few ml of concentrated nitric acid. The solution was stirred for three hours keeping the temperature at 50° C. The solution was then brought to a volume of 1 litre with 10% wt. acetic acid (precursor).

A mesh of nickel 200 of 100 mm×100 mm×0.89 mm size was subjected to a process of blasting with corundum, etching in 20% HCl at 85° C. for 2 minutes and thermal annealing at 500° C. for 1 hour. The previously obtained precursor was then applied by brushing in 7 subsequent coats, carrying out a drying treatment for 10 minutes at 80-90° C. and a thermal decomposition for 10 minutes at 500° C. after each coat until obtaining a deposition of 12 g/m$^2$ of Ru.

The sample was subjected to a performance test, showing an ohmic drop-corrected initial cathodic potential of −925 mV/NHE at 3 kA/m$^2$ under hydrogen evolution in 33% NaOH, at a temperature of 90° C., which indicates an excellent catalytic activity.

The same sample was subsequently subjected to cyclic voltammetry in a range of −1 to +0.5 V/NHE at a 10 mV/s scan rate; after 25 cycles, the cathodic potential was −979 mV/NHE, which indicates an excellent current reversal tolerance.

EXAMPLE 3

A quantity of Pt diamino dinitrate, $Pt(NH_3)_2(NO_3)_2$ corresponding to 50 g of Pt was dissolved in 200 ml of glacial acetic acid. The solution was stirred for 3 hours keeping the temperature at 50° C., then brought to a volume of 500 ml with 10% wt. acetic acid (platinum solution).

A quantity of $Ru(NO)(NO_3)_3$ corresponding to 100 g of Ru was dissolved in 300 ml of glacial acetic acid with addition of few ml of concentrated nitric acid. The solution was stirred for three hours keeping the temperature at 50° C. The solution was then brought to a volume of 500 ml with 10% wt. acetic acid (ruthenium solution).

Separately, a quantity of $Pr(NO_3)_2$ corresponding to 100 g of Pr was dissolved in 300 ml of glacial acetic acid with addition of few ml of concentrated nitric acid. The solution was stirred for three hours keeping the temperature at 50° C. The solution was then brought to a volume of 500 ml with 10% wt. acetic acid (rare earth solution). 480 ml of the ruthenium solution were mixed to 120 ml of the rare earth solution and left under stirring for five minutes. The thus obtained solution was brought to 1 litre with 10% wt. acetic acid (precursor).

A mesh of nickel 200 of 100 mm×100 mm×0.89 mm size was subjected to a process of blasting with corundum, etching in 20% HCl at 85° C. for 2 minutes and thermal annealing at 500° C. for 1 hour.

The platinum solution was then applied by brushing in just one coat, getting 0.9 g/m$^2$ of Pt.

The ruthenium and praseodymium precursor was then applied by brushing in 5 subsequent coats, carrying out a drying treatment for 10 minutes at 80-90° C. and a thermal decomposition for 10 minutes at 500° C. after each coat until obtaining a deposition of 7.8 g/m$^2$ of Ru and 1.95 g/m$^2$ of Pr.

The sample was subjected to a performance test, showing an ohmic drop-corrected initial cathodic potential of −922 mV/NHE at 3 kA/m$^2$ under hydrogen evolution in 33% NaOH, at a temperature of 90° C., which indicates an excellent catalytic activity.

The same sample was subsequently subjected to cyclic voltammetry in a range of −1 to +0.5 V/NHE at a 10 mV/s scan rate; after 25 cycles, the cathodic potential was −940 mV/NHE, which indicates an excellent current reversal tolerance.

COUNTEREXAMPLE 1

A mesh of nickel 200 of 100 mm×100 mm×0.89 mm size was subjected to a process of blasting with corundum, etching in 20% HCl at 85° C. for 2 minutes and thermal annealing at 500° C. for 1 hour. The mesh was then activated by applying RuCl$_3$ in nitric solution by brushing at a concentration of 96 g/l, carrying out a drying treatment for 10 minutes at 80-90° C. and a thermal decomposition for 10 minutes at 500° C. after each coat until obtaining a deposition of 12.2 g/m$^2$ of Ru.

The sample was subjected to a performance test, showing an ohmic drop-corrected initial cathodic potential of −942 mV/NHE at 3 kA/m$^2$ under hydrogen evolution in 33% NaOH, at a temperature of 90° C., which indicates a fair catalytic activity.

The same sample was subsequently subjected to cyclic voltammetry in a range of −1 to +0.5 V/NHE at a 10 mV/s scan rate; after 25 cycles, the cathodic potential was −1100 mV/NHE, which indicates a modest current reversal tolerance.

COUNTEREXAMPLE 2

A quantity of RuCl$_3$ corresponding to 100 g of Ru was dissolved in 300 ml of glacial acetic acid with addition of few ml of concentrated nitric acid. The solution was stirred for three hours keeping the temperature at 50° C. The solution was then brought to a volume of 500 ml with 10% wt. acetic acid (ruthenium solution).

Separately, a quantity of Pr(NO$_3$)$_2$ corresponding to 100 g of Pr was dissolved in 300 ml of glacial acetic acid with addition of few ml of concentrated nitric acid. The solution was stirred for three hours keeping the temperature at 50° C. The solution was then brought to a volume of 500 ml with 10% wt. acetic acid (rare earth solution).

480 ml of the ruthenium solution were mixed to 120 ml of the rare earth solution and left under stirring for five minutes. The thus obtained solution was brought to 1 litre with 10% wt. acetic acid (precursor).

A mesh of nickel 200 of 100 mm×100 mm×0.89 mm size was subjected to a process of blasting with corundum, etching in 20% HCl at 85° C. for 2 minutes and thermal annealing at 500° C. for 1 hour. The precursor was then applied by brushing in 7 subsequent coats, carrying out a drying treatment for 10 minutes at 80-90° C. and a thermal decomposition for 10 minutes at 500° C. after each coat until obtaining a deposition of 12.6 g/m$^2$ of Ru and 1.49 g/m$^2$ of Pr.

The sample was subjected to a performance test, showing an ohmic drop-corrected initial cathodic potential of −932 mV/NHE at 3 kA/m$^2$ under hydrogen evolution in 33% NaOH, at a temperature of 90° C., which indicates a good catalytic activity.

The same sample was subsequently subjected to cyclic voltammetry in a range of −1 to +0.5 V/NHE at a 10 mV/s scan rate; after 25 cycles, the cathodic potential was −1080 mV/NHE, which indicates a modest current reversal tolerance.

COUNTEREXAMPLE 3

A quantity of Ru(NO)(NO$_3$)$_3$ corresponding to 100 g of Ru was dissolved in 500 ml of 37% by volume hydrochloric acid with addition of few ml of concentrated nitric acid. The solution was stirred for three hours keeping the temperature at 50° C. The solution was then brought to a volume of 500 ml with 10% wt. acetic acid (ruthenium solution).

Separately, a quantity of Pr(NO$_3$)$_2$ corresponding to 100 g of Pr was dissolved in 500 ml of 37% by volume hydrochloric acid with addition of few ml of concentrated nitric acid. The solution was stirred for three hours keeping the temperature at 50° C. (rare earth solution).

480 ml of the ruthenium solution were mixed to 120 ml of the rare earth solution and left under stirring for five minutes. The thus obtained solution was brought to 1 litre with 1 N hydrochloric acid (precursor).

A mesh of nickel 200 of 100 mm×100 mm×0.89 mm size was subjected to a process of blasting with corundum, etching in 20% HCl at 85° C. for 2 minutes and thermal annealing at 500° C. for 1 hour. The precursor was then applied by brushing in 7 subsequent coats, carrying out a drying treatment for 10 minutes at 80-90° C. and a thermal decomposition for 10 minutes at 500° C. after each coat until obtaining a deposition of 13.5 g/m$^2$ of Ru and 1.60 g/m$^2$ of Pr.

The sample was subjected to a performance test, showing an ohmic drop-corrected initial cathodic potential of −930 mV/NHE at 3 kA/m$^2$ under hydrogen evolution in 33% NaOH, at a temperature of 90° C., which indicates a good catalytic activity.

The same sample was subsequently subjected to cyclic voltammetry in a range of −1 to +0.5 V/NHE at a 10 mV/s scan rate; after 25 cycles, the cathodic potential was −1090 mV/NHE, which indicates a modest current reversal tolerance.

EXAMPLE 4

The electrodes obtained in Example 1 and Counterexample 1 were subjected to spectroscopic characterisations by X-ray absorption, XANES (X-ray Absorption Near Edge Structure) and EXAFS (Extended X-Ray Absorption Fine Structure). The XANES spectra of the two samples looked qualitatively similar but not identical, displaying short-range structural differences.

The corresponding EXAFS spectra show in fact that although the same rutile-type fundamental structure is present—i.e. a primitive tetragonal lattice wherein ruthenium atoms are surrounded by six oxygen atoms located at the vertices of a octahedron and oxygen atoms are surrounded by 3 ruthenium atoms arranged according to a planar trigonal coordination—some significant differences are visible.

The interpolation of the first coordination sphere, which provides information internal to the octahedral structure with the ruthenium atom at the centre, shows how the sample of Example 1 has a coordination number much closer to the theoretical one, while that of Counterexample 1 presents two additional oxygen atoms, indicating the existence of an amorphous Ru—OH or RuOH$_2$ phase due to the presence of H$_2$O inside the lattice. The corresponding Debye-Waller factor shows a much higher degree of order for the sample of Example 1, as it can be inferred from Table 1:

TABLE 1

| sample | r (Å) | n (atoms) | $\sigma * 10^{-3}$ (Å$^2$) |
|---|---|---|---|
| Example 1 | 1.96 | 6.24 | 1.2 |
| Counterexample 1 | 1.97 | 7.78 | 4.2 |
| Rutile (theoretical) | 1.98 | 6 | |

The interpolation of the second sphere gives information about the Ru—Ru (a and b, corresponding to the two different sides of the primitive tetragonal cell) and Ru—O bonds. In this case, the obtained data show how the samples of the example and of the counterexample have minor differences (mutually and with respect to the theoretical model) as regards the Ru—Ru bond length, while the Ru—O bond is significantly longer for the sample of the counterexample (Table 2) This implies that the degree of distortion dramatically evidenced by the Debye-Waller factor, is fundamentally attributable to oxygen atom dislocations.

TABLE 2

| sample | bond | r (Å) | n (atoms) | $\sigma * 10^{-3}$ (Å$^2$) |
|---|---|---|---|---|
| Example 1 | Ru—Ru (a) | 3.12 | 1.34 | 1 |
| | Ru—Ru (b) | 3.54 | 4.24 | |
| | Ru—O | 3.77 | 8 | 1.5 |
| Counterexample 1 | Ru—Ru (a) | 3.10 | 0.94 | 3.4 |
| | Ru—Ru (b) | 3.56 | 3.32 | |
| | Ru—O | 3.87 | 8 | 5.2 |
| Rutile (theoretical) | Ru—Ru (a) | 3.11 | 2 | |
| | Ru—Ru (b) | 3.55 | 8 | |
| | Ru—O | 3.69 | 8 | |

Those reported above are the most significant data of a vast EXAFS testing campaign carried out on a large number of samples, corresponding to analogous structures prepared in accordance with the examples (totally chloride-free environments, with variable precursors and compositions) and the counterexamples (presence of chlorides in the base reactants, or as hydrochloric acid in the reaction environment).

In all cases, the interpolation of the second coordination sphere provided a Debye-Waller factor largely lower than $2*10^{-3}$ Å$^2$ in the absence of chlorides (both for the Ru—Ru and for the Ru—O bonds) and not lower than 3 in the presence of chlorides (in particular, always higher than 4.8 for the Ru—O bond). It was possible moreover to verify a good correlation between degree of disorder (with particular reference to the Debye-Waller factor for the Ru—O bond) and electrode performances, especially in terms of current reversal tolerance.

The previous description shall not be intended as limiting the invention, which may be used according to different embodiments without departing from the scopes thereof, and whose extent is solely defined by the appended claims.

Throughout the description and claims of the present application, the term "comprise" and variations thereof such as "comprising" and "comprises" are not intended to exclude the presence of other elements, components or additional process steps.

The invention claimed is:

1. Industrial electrode for cathodic evolution of hydrogen in electrolytic processes comprising:
   a metal substrate coated with an external catalytic layer containing 4 to 40 g/m$^2$ of crystalline ruthenium oxide having a rutile-type structure, and having Ru—Ru and Ru—O bond length characterized by a Debye-Waller factor lower than $2*10^{-3}$ Å$^2$; and
   an internal catalytic layer containing 0.5 to 2 g/m$^2$ of platinum in form of oxide or metal, interposed between said metal substrate and said external catalytic layer.

2. The electrode according to claim 1 wherein said external catalytic layer further contains 1 to 10 g/m$^2$ of rare earths in form of oxides.

3. The electrode according to claim 2 wherein said rare earths comprise praseodymium oxide.

4. The electrode according to claim 1 wherein said metal substrate is made of nickel or nickel alloy.

* * * * *